May 23, 1950  D. R. HENLEY  2,508,824
VEHICLE DIRECTION SIGNAL
Filed Sept. 12, 1949

Decator R. Henley
INVENTOR.

BY Clarence A. O'Brien
and Harvey B. Jacobson
Attorneys

Patented May 23, 1950

2,508,824

UNITED STATES PATENT OFFICE 2,508,824

VEHICLE DIRECTION SIGNAL

Decator R. Henley, Cross Plains, Tex.

Application September 12, 1949, Serial No. 115,180

1 Claim. (Cl. 116—47)

The present invention relates to certain new and useful improvements in vehicle direction signals and has more particular reference to a signal construction which is purely mechanical and manually actuatable.

More specifically, the invention has to do with a mechanical signal of the type which utilizes a rotatable reciprocably mounted vertical shaft, said shaft being turnable and slidable in a fixed bearing mounted in the roof of the vehicle, there being a direction indicating arrow on the upper end of said shaft in a plane above the roof and a complemental tell-tale arrow on the interior of the vehicle, that is, underlying the roof, said tell-tale also functioning as a convenient handle for lifting, lowering and turning the shaft and both arrows.

It will be seen from the foregoing that the objective here is to structurally, functionally and otherwise improve upon prior art direction signals in the category under advisement. Therefore, one aspect of the newer arrangement has to do with a simple tube which is mounted in an opening provided therefor in the roof and whose lower end portion is provided with a semi-circular slot and several selectively usable keeper notches or seats, the latter being positioned to accommodate a keeper pin which is mounted on and carried at right angles to the longitudinal axis of said shaft whereby to thus provide a simple and efficient direction signal in which users will find their needs and requirements fully met, contained and available.

Novelty is also predicated upon the slotted tubular bearing, as above stated, wherein the keeper pin and tell-tale arrow are detachably mounted on the shaft to permit the same to be detached and to allow the shaft with its fixed direction arrow to be withdrawn, for purposes of repair, from said bearing.

In addition to the foregoing, novelty is thought to reside in the provision of a conical adaptor, the latter mounted on the upper end portion of the shaft and constituting a bonnet or hood which fits over and rotates freely upon the upper end of said bearing.

Other objects and advantages will become more readily apparent from the following description and accompanying illustrative drawings.

In the accompanying sheet of drawings wherein like numerals are employed to designate like parts throughout the views.

Figure 1:
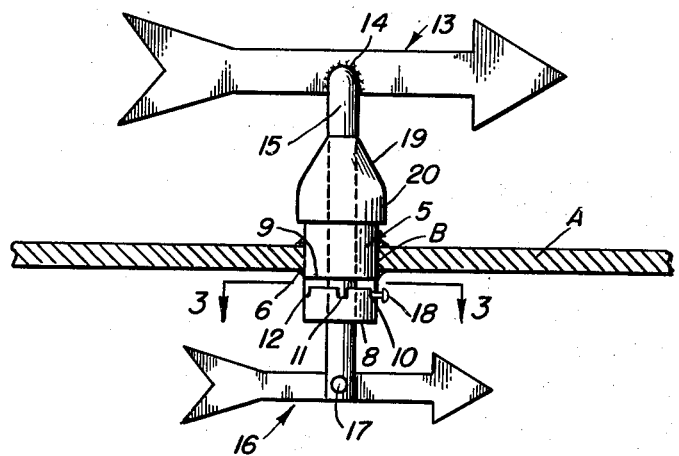
Figure 1 is an elevational view showing a fragmentary portion of a vehicle roof and the improved direction signal mounted thereon, the arrow heads pointing to denote a right hand turn.
Figure 2:
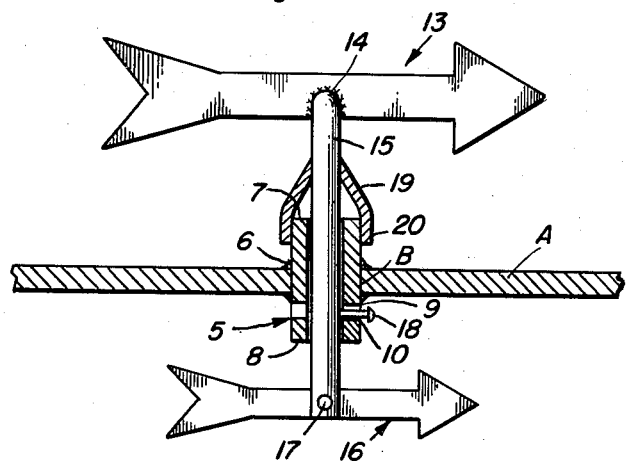
Figure 2 is a view based on Figure 1 with certain of the parts in section.
Figure 3:
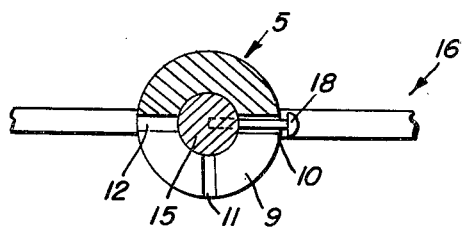
Figure 3 is a horizontal section, on an enlarged scale, taken on the section line 3—3 of Figure 1, looking in the direction of the arrows.

Referring now to the drawings by reference numerals and lead lines, the roof of the automobile is denoted at A and same is provided with an opening to accommodate the adaptor tube 5. Said tube is fitted into the aperture and welded in place as at 6 so that approximately one half portion 7 projects above the roof and the other half portion 8 projects below the roof into the tonneau of the vehicle. Obviously, the tube will be positioned so that the entire signalling device will be in convenient reach of the driver of the vehicle. The rear half portion of the depending part of the tubular bearing is provided with a semi-circular slot 9. The lower edge of the slot is provided with three notches which may be differentiated as a right turn notch 10, a straight ahead notch 11 and a left turn notch 12. In observing Figure 1 wherein we see these several notches, it is to be assumed that the main direction denoting signal or arrow 13, which is welded at 14 to the upper end of the spindle or shaft 15 is parallel to the windshield and that it is in advance of the observer. Shaft 15, as stated, is rotatable and slidable in the tube and therefore, the tube serves as a bearing and mount. There is a smaller and companion or complemental arrow 16 and this is a "tell-tale" or position indicating member. It is a small duplicate of the direction arrow 13 and of course, points in the same direction. It is suitably bolted or otherwise detachably mounted at 17 intermediate its ends on the lower end portion of shaft 15. It serves not only as a "tell-tale" for the driver to show the exact position of the exteriorly disposed direction arrow 13, but also constitutes a convenient handle for operating the shaft 15. That is to say, it serves to enable the driver to reach up and catch hold of the tell-tale arrow 16 and to use it for lifting and lowering the shaft and also turning it. To establish the several predetermined positions of the arrows and the shaft in relation to the bearing tube, a headed keeper pin 18 is provided. This, as shown in Figure 3 is threaded into a socket in the shaft. The headed end of the pin is adapted to be selectively seated in the notches 10, 11 or 12. The aforementioned bonnet is in the form of a substantially conical hood and the same is denoted by the numeral 19 and is fixed on the shaft 15 below the arrow 13, as shown in Figure 1. It has an annular skirt or rim portion 20 which telescopes over and is rotatable upon the upper end portion 7 of the bearing. This arrangement allows the shaft, upper and lower arrows, keeper pin and hood to operate as a unit.

Under normal driving circumstances, the headed keeper pin 18 would be seated in the "straight ahead" notch 11. This would position both arrows parallel to the longitudinal axis of the vehicle. Upon desiring to make a right turn, as shown in Figure 1, the driver would simply reach overhead, catch hold of the arrow 16, using same as a handle. He would then lift up on the shaft and dislodge the keeper pin from slot 11 and turn the shaft and both arrows to approximately 90° and then let go, allowing the pin 18 to drop down into the keeper seat 10. Of course, to indicate a left turn, the keeper pin would have to be turned to approximately 180° from that shown in Figure 1 in order to seat said pin in the diametrically opposite keeper notch 12.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice if desired.

Having described the invention, what is claimed as new is:

A direction indicating signal, wholly mechanical in type, attachable to the roof of a vehicle, comprising a vertically disposed bearing tube, a correspondingly disposed shaft mounted for rotation in said tube and having ends extending above and below the corresponding ends of said tube, a direction indicating arrow at right angles to and fixed on the upper end of said shaft, a companion tell-tale arrow, a duplicate of but smaller than said first-named arrow, detachably mounted on the lower end of said shaft, a bonnet secured to the intermediate portion of said shaft and telescopically and rotatably fitted over the upper end of said tube, and coacting retaining means between the tube and shaft for holding the shaft in adjusted positions, said means comprising a semi-circular slot formed in the lower portion of the tube, said slot having circumferentially spaced keeper seats, and a keeper pin carried by said shaft and selectively engageable in said seats.

DECATOR R. HENLEY.

REFERENCES CITED

The following references are of record in the file of this patent:

UNITED STATES PATENTS

| Number | Name | Date |
|---|---|---|
| 1,555,700 | Pickett | Sept. 29, 1925 |
| 1,705,142 | Rubio | Mar. 12, 1929 |
| 1,994,737 | Webb | Mar. 19, 1935 |
| 2,262,424 | Kukuhara | Nov. 11, 1941 |